US012770948B2

(12) United States Patent
Xie et al.

(10) Patent No.: US 12,770,948 B2
(45) Date of Patent: Oct. 20, 2026

(54) METHOD FOR SEPARATING AND RECOVERING VALUABLE METALS FROM WASTE TERNARY LITHIUM BATTERIES

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Yinghao Xie, Foshan (CN); Haijun Yu, Foshan (CN); Aixia Li, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 664 days.

(21) Appl. No.: 18/213,842

(22) Filed: Jun. 25, 2023

(65) Prior Publication Data

US 2023/0335818 A1 Oct. 19, 2023

Related U.S. Application Data

(63) Continuation of application No. PCT/CN2022/090067, filed on Apr. 28, 2022.

(30) Foreign Application Priority Data

Sep. 30, 2021 (CN) ........................ 202111159214.X

(51) Int. Cl.
*C22B 3/42* (2006.01)
*C01D 15/08* (2006.01)
(Continued)

(52) U.S. Cl.
CPC ............ *H01M 10/54* (2013.01); *C01D 15/08* (2013.01); *C01G 45/024* (2025.01); *C01G 51/05* (2025.01);
(Continued)

(58) Field of Classification Search
CPC ........ C01D 15/08; C01G 45/02; C01G 51/04; C01G 53/04; C22B 3/22; C22B 3/42;
(Continued)

(56) References Cited

U.S. PATENT DOCUMENTS 2,956,860 A * 10/1960 Welsh .................... C01G 45/02 423/605

FOREIGN PATENT DOCUMENTS

CN 111600013 A * 8/2020 ............ H01M 4/505
CN 111994925 A * 11/2020 ............. C01G 53/82
CN 109182732 B * 1/2021 ........... C22B 3/3842

OTHER PUBLICATIONS

English machine translation of Zhu 2021 (CN 109182732 B) (Year: 2021).*

(Continued)

*Primary Examiner* — Michael Forrest
*Assistant Examiner* — Eileen Moudou
(74) *Attorney, Agent, or Firm* — Westbridge IP LLC

(57) ABSTRACT

The present disclosure belongs to the technical field of lithium battery recycling, and discloses a method for separating and recovering valuable metals from waste ternary lithium batteries. The method includes the following steps: adding a persulfate to a waste ternary lithium battery powder, and conducting oxidative acid leaching to obtain a
(Continued)

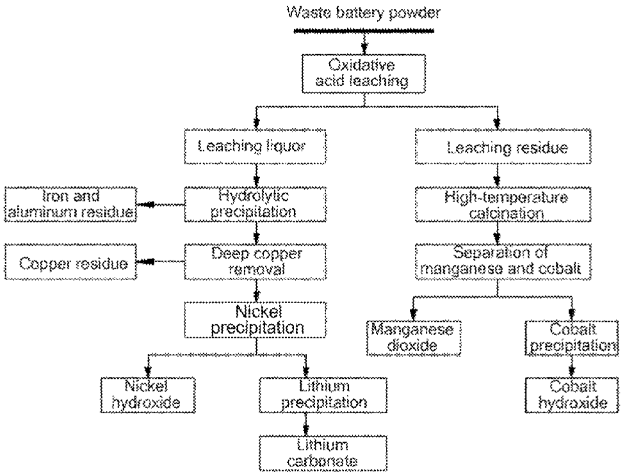

leaching liquor and a leaching residue; adding an alkali to the leaching liquor to allow a precipitation reaction; adding a sulfide salt to allow a reaction; adjusting a pH to allow a precipitation reaction to obtain a nickel hydroxide precipitate and a liquid phase A; adding a carbonate to the liquid phase A to allow a reaction, and conducting solid-liquid separation (SLS) to obtain lithium carbonate; and subjecting the leaching residue to calcination, adding a chlorate, heating a resulting mixture, and conducting SLS to obtain manganese dioxide.

8 Claims, 1 Drawing Sheet

(51) Int. Cl.

| | |
|---|---|
| ***C01G 45/024*** | (2025.01) |
| ***C01G 51/05*** | (2025.01) |
| ***C01G 53/05*** | (2025.01) |
| ***C22B 3/00*** | (2006.01) |
| ***C22B 3/22*** | (2006.01) |
| ***C22B 7/00*** | (2006.01) |
| ***C22B 26/12*** | (2006.01) |
| ***C22B 47/00*** | (2006.01) |
| ***H01M 10/54*** | (2006.01) |

(52) U.S. Cl.
CPC ................ *C01G 53/05* (2025.01); *C22B 3/22* (2013.01); *C22B 3/42* (2013.01); *C22B 7/007* (2013.01); *C22B 23/043* (2013.01); *C22B 23/0461* (2013.01); *C22B 26/12* (2013.01); *C22B 47/00* (2013.01)

(58) Field of Classification Search
CPC ... C22B 7/007; C22B 23/043; C22B 23/0461; C22B 26/12; C22B 47/00; C22B 3/44; C22B 15/0089; C22B 23/0484; C22B 7/006; C22B 47/0045; H01M 10/54; H01M 10/0525; Y02P 10/20; Y02W 30/84
See application file for complete search history.

(56) References Cited

OTHER PUBLICATIONS

English machine translation of Bi 2020 (CN 111600013 A) (Year: 2020).*
English machine translation of Dong 2020 (CN 111994925 A) (Year: 2020).*
Selective leaching of nickel from mixed nickel cobalt hydroxide precipitate (Year: 2013).*
Williams 2013, Selective leaching of nickel from mixed nickel cobalt hydroxide precipitate, Hydrometallurgy, vol. 138, Jun. 2013, pp. 84-92 (Year: 2013).*

* cited by examiner

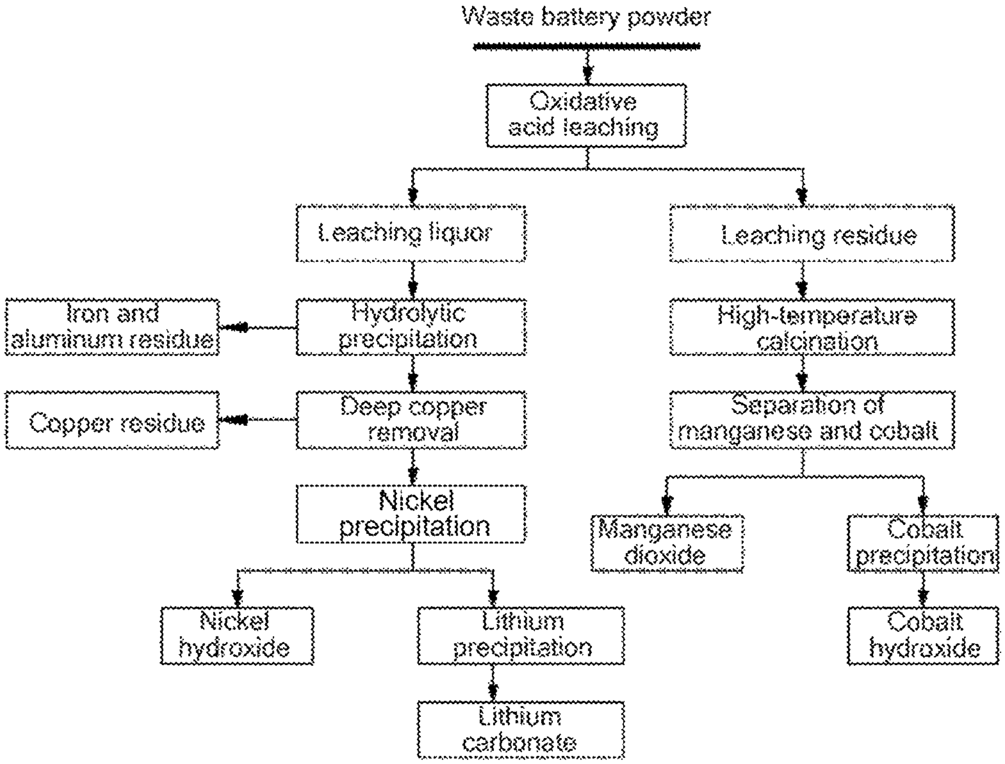
Waste battery powder
Oxidative acid leaching
Leaching liquor
Leaching residue
Iron and aluminum residue
Hydrolytic precipitation
High-temperature calcination
Copper residue
Deep copper removal
Separation of manganese and cobalt
Nickel precipitation
Manganese dioxide
Cobalt precipitation
Nickel hydroxide
Lithium precipitation
Cobalt hydroxide
Lithium carbonate

METHOD FOR SEPARATING AND RECOVERING VALUABLE METALS FROM WASTE TERNARY LITHIUM BATTERIES

CROSS-REFERENCE TO RELATED APPLICATIONS

The present application is a continuation application of PCT application No. PCT/CN2022/090067 filed on Apr. 28, 2022, which claims the benefit of Chinese Patent Application No. 202111159214.X filed on Sep. 30, 2021. The contents of all of the aforementioned applications are incorporated by reference herein in their entirety.

TECHNICAL FIELD

The present disclosure belongs to the technical field of lithium battery recycling, and specifically relates to a method for separating and recovering valuable metals from waste ternary lithium batteries.

BACKGROUND

Because ternary batteries are rich in valuable metals, ternary batteries are usually directly disassembled, and then lithium, cobalt, nickel, manganese, copper, aluminum, graphite, diaphragm, and other materials are extracted, which can theoretically achieve an economic income of about 42,900 yuan per ton (this data changes with the fluctuation of metal prices), enabling the economic feasibility. An average lithium content in ternary batteries is significantly higher than that in lithium ores developed and utilized in China, and nickel, cobalt, and manganese are all valuable non-ferrous metals. Therefore, the disassembly and recycling of ternary batteries has high economic value.

In recent years, recovering methods of valuable metals in lithium batteries mainly include pyrometallurgy and hydrometallurgy. Pyrometallurgy requires large energy consumption, and air pollutants produced are likely to cause secondary pollution. Hydrometallurgy has the advantages of low pollution and easy control, and thus a large number of studies are concentrated on hydrometallurgy. A general process of hydrometallurgy includes: leaching out valuable metals, conducting fractional precipitation according to different properties of different metals, and conducting further purification to obtain a final product.

Currently, the acid leaching method is a common leaching method, including inorganic acid leaching and organic acid leaching, where valuable metals are leached out by breaking the M—O bond (M represents a metal, such as cobalt, nickel, and manganese). For inorganic acid leaching, hydrochloric acid, sulfuric acid, and nitric acid are often used as a leaching agent, with a concentration of 1 mol/L and 4 mol/L; and hydrogen peroxide and glucose are used as a reducing agent. The leaching method mainly includes the two steps of pretreatment and acid leaching. In a leaching process, a scrapped lithium-ion battery (LIB) first undergoes a series of operations such as disassembly, crushing, sieving, sorting, magnetic separation, primary grinding, cathode material separation, and secondary grinding, and then an inorganic acid (strong acids such as hydrochloric acid, nitric acid, and sulfuric acid) is added as a leaching agent and a specified amount of hydrogen peroxide is also added to extract lithium, cobalt, nickel, and manganese from a positive electrode active material.

Although the acid leaching method shows relatively high efficiency for leaching valuable metals from lithium battery cathode materials, harmful gases such as sulfur oxides and nitrogen oxides are generated during a leaching reaction, which will pollute the environment and damage the health of workers. In a leaching process of the traditional method, all dissoluble metal ions are leached out, and then a series of impurity removal procedures are conducted to obtain a metal salt solution with high purity. In the impurity removal process, expensive organic solvents need to be added for extraction, and the separation of some metal ions requires multi-stage extraction, which involves a long extraction process and a high metal loss rate, and is time-consuming and labor-intensive.

In addition to the acid leaching method, biological leaching is a method widely reported in literatures, where cobalt and lithium ions are leached out through metabolic activities of microorganisms such as *Acidithiobacillus ferrooxidans* (*A. ferrooxidans*) to produce acids. This method has the advantage of low cultivation cost, but the growth of bacteria is easily restricted by objective conditions and the cultivation period is long. Therefore, the biological leaching method is difficult to quickly realize the recovery of valuable metals in lithium batteries on a large scale.

Therefore, there is an urgent need to develop a leaching method for recovering valuable metals from lithium batteries, which can avoid the use of organic solvents causing the generation of harmful gases such as sulfur oxides and nitrogen oxides, improve the purity of extracted elements, and show high efficiency and low cost.

SUMMARY

The present disclosure is intended to solve at least one of the technical problems existing in the prior art. In view of this, the present disclosure provides a method for separating and recovering valuable metals from waste ternary lithium batteries. In the method, a strongly-oxidative selective acid is used to leach nickel and lithium, and a leaching residue is then separately processed to extract cobalt and prepare active manganese dioxide.

To achieve the above objective, the present disclosure adopts the following technical solutions:

A method for separating and recovering valuable metals from waste ternary lithium batteries is provided, including the following steps:

(1) adding a persulfate and a first acid to a waste ternary lithium battery powder for oxidative acid leaching, and conducting solid-liquid separation (SLS) to obtain a leaching liquor and a leaching residue;

(2) adding an alkali to the leaching liquor to allow a first precipitation reaction, and conducting SLS to obtain a first liquid phase; adding a sulfide salt to allow a second precipitation reaction, and conducting SLS to obtain a second liquid phase; and adjusting a pH of the second liquid phase to allow a third precipitation reaction, and conducting SLS to obtain a nickel hydroxide precipitate and a liquid phase A;

(3) adding a carbonate to the liquid phase A to allow a precipitation reaction, and conducting SLS to obtain a solid phase, which is lithium carbonate; and (4) subjecting the leaching residue obtained in step (1) to calcination, adding a second acid and a chlorate, heating a resulting mixture, and conducting SLS to obtain a solid phase and a liquid phase, where the solid phase is manganese dioxide and the liquid phase is a cobalt solution.

Preferably, in step (1), the first acid may be one selected from the group consisting of sulfuric acid and hydrochloric acid.

Preferably, in step (1), the oxidative acid leaching may be conducted at a temperature of 80° C. to 120° C. and a pH of 0.5 to 1.0.

Preferably, in step (1), the persulfate may be at least one from the group consisting of sodium persulfate (SPS), potassium persulfate (KPS), and ammonium persulfate (APS).

Preferably, in step (1), in the oxidative acid leaching, a molar ratio of a total amount of nickel, cobalt, and manganese in the waste ternary lithium battery powder to an amount of the persulfate may be 1:(0.1-3.5).

Further preferably, the waste ternary lithium battery powder and the persulfate may be first mixed to obtain a mixture, and then the mixture is subjected to oxidative acid leaching, where a solid-to-liquid ratio of the mixture to sulfuric acid in the oxidative acid leaching may be 200 to 600 g/L.

Preferably, in step (2), the alkali may be one or two selected from the group consisting of sodium hydroxide and potassium hydroxide.

Preferably, in step (2), the first precipitation reaction may be conducted at a pH of 5.0 to 5.5.

Preferably, in step (2), the sulfide salt may be one or two selected from the group consisting of sodium sulfide and potassium sulfide.

Preferably, in step (2), a molar ratio of the sulfide salt to copper ions in the leaching liquor may be 1:(1-2).

Preferably, in step (2), the pH may be adjusted to 9.5 to 10.0.

Preferably, in step (3), the carbonate may be one or two selected from the group consisting of sodium carbonate and potassium carbonate.

Preferably, in step (4), the second acid may be one from the group consisting of sulfuric acid and hydrochloric acid.

Further preferably, the sulfuric acid may have a concentration of 0.1 mol/L to 4.0 mol/L.

Preferably, in step (4), a molar ratio of manganese in the leaching residue to the chlorate may be 1:(0.2-0.5).

Preferably, in step (4), the heating may be conducted at 80° C. to 100° C. for 1 h to 5 h.

Preferably, in step (4), the calcination may be conducted at 600° C. to 1,050° C. for 1 h to 5 h in an air or oxygen atmosphere.

Preferably, in step (4), the chlorate may be one or two selected from the group consisting of sodium chlorate and potassium chlorate.

Preferably, in step (4), the liquid phase may be used to prepare cobalt hydroxide.

Further preferably, the cobalt hydroxide may be prepared as follows: adjusting a pH of the liquid phase to 9.0 to 9.5, and conducting SLS to obtain the cobalt hydroxide.

Reaction equations of steps (1) and (4):

Step (1): $LiMO_2+0.5xS_2O_8^{2-}═Li_{1-x}MO_{2+x}SO_4^{2-}+xLi^+$.

M is Ni, Co, or Mn, and as the reaction progresses, Ni, Co, or Mn is dissolved by an acid. Under the strong oxidation of persulfate anion, Co and Mn ions undergo the following reactions:

$S_2O_8^{2-}+Mn^{2+}+2H_2O═2SO_4^{2-}+MnO_2+4H^+$;

$S_2O_8^{2-}+Co^{2+}+2H_2O═2SO_4^{2-}+CoO_2+4H^+$;

$S_2O_8^{2-}+2Fe^{2+}═2SO_4^{2-}+2Fe^{3+}$; and $S_2O_8^{2-}+Cu═2SO_4^{2-}+Cu^{2+}$.

However, the persulfate anion cannot oxidize nickel ions, and thus nickel ions, lithium ions, ferric ions, aluminum ions, and copper ions all enter the leaching liquor.

Step (4): The leaching residue is composed of manganese dioxide, cobalt dioxide, and graphite. Through high-temperature calcination, graphite reacts with oxygen to generate carbon dioxide, and manganese dioxide and cobalt dioxide are decomposed into $Mn_2O_3$ and CoO, respectively. Then the calcination products are heated together with a chlorate under acidic conditions to undergo the following reactions:

$Mn_2O_3+H_2SO_4═MnO_2+MnSO_4+H_2O$;

$5MnSO_4+2NaClO_3+4H_2O═5MnO_2\downarrow+Na_2SO_4+4H_2SO_4+Cl_2\uparrow$; and $CoO+H_2SO_4═CoSO_{4+}H_2O$.

The disproportionation reaction of manganese is used to prepare active manganese dioxide. A pH of the liquid phase is adjusted to precipitate cobalt ions, such that cobalt ions are separated from sodium or potassium ions to obtain pure cobalt hydroxide.

Beneficial effects of the present disclosure:

1. In the method of the present disclosure, a persulfate is used as a strong oxidant to conduct leaching for the battery powder under acidic conditions, where under the strong oxidation of persulfate anion, the leaching of cobalt and manganese in the battery powder is inhibited, such that the cobalt and manganese form the leaching residue in the forms of manganese dioxide and cobalt dioxide together with graphite, and other metal ions all enter the leaching liquor, thereby achieving first-stage separation of metal elements. The method avoids the use of organic solvents in acid leaching that cause the generation of harmful gases such as sulfur oxides and nitrogen oxides, and leads to extracted elements with high purity and yield.
2. In the present disclosure, a pH of the leaching liquor obtained after the oxidative acid leaching is first adjusted for hydrolytic precipitation of ferric ions and aluminum ions; then sodium sulfide is added for complete precipitation of copper ions to obtain a solution only with nickel and lithium; a pH is adjusted for complete precipitation of nickel to obtain nickel hydroxide; and then lithium is precipitated to obtain lithium carbonate. The nickel hydroxide obtained by this method has high purity.
3. In the present disclosure, the leaching residue is subjected to high-temperature calcination, where graphite reacts with oxygen to generate carbon dioxide, and manganese dioxide and cobalt dioxide are decomposed into $Mn_2O_3$ and CoO, respectively; then the calcination products are heated together with a chlorate under acidic conditions, where the disproportionation reaction of manganese is used to prepare active manganese dioxide; and a pH is adjusted to precipitate cobalt ions, such that cobalt ions are separated from sodium or potassium ions to obtain pure cobalt hydroxide. The present disclosure can be widely used in the recycling of waste ternary lithium batteries, especially in the recycling of cathode materials of ternary lithium batteries.

BRIEF DESCRIPTION OF DRAWINGS

The sole FIGURE is a schematic diagram of the process flow of the present disclosure.

DETAILED DESCRIPTION

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

A method for separating and recovering valuable metals from waste ternary lithium batteries was provided in this example, including the following steps:

100 g of a waste ternary lithium battery powder was collected, which had the following metal contents: nickel: 15.37%, cobalt: 11.26%, manganese: 9.42%, lithium: 4.23%, iron: 0.96%, aluminum: 1.56%, and copper: 1.51%. Valuable metals were separated and recovered through the following steps:

(1) The 100 g of waste ternary lithium battery powder was subjected to oxidative acid leaching in a mixed system of 0.5 L of sulfuric acid and 145 g of SPS, and then SLS was conducted to obtain a leaching liquor and a leaching residue, where the oxidative acid leaching was conducted for 6 h at a pH of 0.5 to 1.0 and a temperature of 90° C.

(2) A pH of the leaching liquor was adjusted to 5.0 to 5.5 with sodium hydroxide for hydrolytic precipitation (to remove iron and aluminum ions); after the hydrolytic precipitation was completed, 2.0 g of sodium sulfide was added for deep removal of copper; and a pH of a liquid obtained after the deep removal of copper was adjusted to 9.5 to 10.0 for complete precipitation of nickel ions to obtain 24.13 g of nickel hydroxide and a liquid phase A.

(3) 35 g of sodium carbonate was added to the liquid phase A for precipitation, and then SLS was conducted to obtain 21.76 g of lithium carbonate.

(4) The leaching residue obtained in step (1) was dried and weighed 67.43 g; then the leaching residue was subjected to calcination at 800° C. in an air atmosphere to obtain 27.93 g of a calcination residue; 1.2 L of 0.2 mol/L sulfuric acid was added to the calcination residue for dissolution, then 4 g of sodium chlorate was added, and a resulting mixture was subjected to a reaction at 100° C. for 4 h; SLS was conducted to obtain 14.9 g of active manganese dioxide and a liquid; and a pH of the liquid was adjusted to 9.0 to 9.5 for complete precipitation of cobalt ions to obtain 17.83 g of cobalt hydroxide.

Without considering the impurities in each product, a yield was calculated, and calculation results were as follows: nickel: 99.41%, cobalt: 100.41% (which may be partially oxidized), manganese: 99.99% (which may include a small amount of impurities), and lithium: 96.65%.

Example 2

A method for separating and recovering valuable metals from waste ternary lithium batteries was provided in this example, including the following steps:

100 g of a waste ternary lithium battery powder was collected, which had the following metal contents: nickel: 19.73%, cobalt: 12.38%, manganese: 13.66%, lithium: 4.34%, iron: 0.98%, aluminum: 1.72%, and copper: 1.49%. Valuable metals were separated and recovered through the following steps:

(1) The 100 g waste ternary lithium battery powder was subjected to oxidative acid leaching in a mixed system of 0.4 L of sulfuric acid and 280 g of SPS, and then SLS was conducted to obtain a leaching liquor and a leaching residue, where the oxidative acid leaching was conducted for 4 h at a pH of 0.5 to 1.0 and a temperature of 100° C.

(2) A pH of the leaching liquor was adjusted to 5.0 to 5.5 with sodium hydroxide for hydrolytic precipitation (to remove iron and aluminum ions); after the hydrolytic precipitation was completed, 2.0 g of sodium sulfide was added for deep removal of copper; and a pH of a liquid obtained after the deep removal of copper was adjusted to 9.5 to 10.0 for complete precipitation of nickel ions to obtain 30.97 g of nickel hydroxide and a liquid phase A.

(3) 35 g of sodium carbonate was added to the liquid phase A for precipitation, and then SLS was conducted to obtain 22.06 g of lithium carbonate.

(4) The leaching residue obtained in step (1) was dried and weighed 61.02 g; then the leaching residue was subjected to calcination at 900° C. in an air atmosphere to obtain 35.40 g of a calcination residue; 0.25 L of 1 mol/L sulfuric acid was added to the calcination residue for dissolution, then 5.5 g of sodium chlorate was added, and a resulting mixture was subjected to a reaction at 90° C. for 2 h; SLS was conducted to obtain 21.45 g of active manganese dioxide and a liquid; and a pH of the liquid was adjusted to 9.0 to 9.5 for complete precipitation of cobalt ions to obtain 19.47 g of cobalt hydroxide.

Without considering the impurities in each product, a yield was calculated, and calculation results were as follows: nickel: 99.39%, cobalt: 99.73%, manganese: 99.27%, and lithium: 95.49%.

Example 3

A method for separating and recovering valuable metals from waste ternary lithium batteries was provided in this example, including the following steps:

100 g of a waste ternary lithium battery powder was collected, which had the following metal contents: nickel: 18.24%, cobalt: 13.22%, manganese: 12.33%, lithium: 4.55%, iron: 0.83%, aluminum: 1.32%, and copper: 1.21%. Valuable metals were separated and recovered through the following steps:

(1) The 100 g waste ternary lithium battery powder was subjected to oxidative acid leaching in a mixed system of 0.3 L of sulfuric acid and 350 g of SPS, and then SLS was conducted to obtain a leaching liquor and a leaching residue, where the oxidative acid leaching was conducted for 3 h at a pH of 0.5 to 1.0 and a temperature of 80° C.

(2) A pH of the leaching liquor was adjusted to 5.0 to 5.5 with sodium hydroxide for hydrolytic precipitation (to remove iron and aluminum ions); after the hydrolytic precipitation was completed, 1.5 g of sodium sulfide was added for deep removal of copper; and a pH of a liquid obtained after the deep removal of copper was adjusted to 9.5 to 10.0 for complete precipitation of nickel ions to obtain 28.61 g of nickel hydroxide and a liquid phase A.

(3) 38 g of sodium carbonate was added to the liquid phase A for precipitation, and then SLS was conducted to obtain 22.33 g of lithium carbonate.

(4) The leaching residue obtained in step (1) was dried and weighed 64.01 g; then the leaching residue was subjected to calcination at 600° C. in an air atmosphere to obtain 34.53 g of a calcination residue; 0.8 L of 0.5 mol/L sulfuric acid was added to the calcination residue for dissolution, then 5 g of sodium chlorate was added, and a resulting mixture was subjected to a reaction at 80° C. for 1 h; SLS was conducted to obtain 19.39 g of active manganese dioxide and a liquid; and a pH of the liquid was adjusted to 9.0 to 9.5 for complete precipitation of cobalt ions to obtain 20.71 g of cobalt hydroxide.

Without considering the impurities in each product, a yield was calculated, and calculation results were as follows: nickel: 99.32%, cobalt: 99.42% (which may be partially oxidized), manganese: 99.42%, and lithium: 92.20%.

The sole FIGURE is a schematic diagram of the process flow of the present disclosure. It can be seen from the sole FIGURE that, in the present disclosure, the waste battery powder is first subjected to oxidative acid leaching to obtain a leaching liquor and a leaching residue; and then the leaching liquor and the leaching residue are treated separately to finally obtain nickel hydroxide, lithium carbonate, manganese dioxide, and cobalt hydroxide.

The above examples are preferred implementations of the present disclosure, and the implementations of the present disclosure are not limited by the above examples. Any change, modification, and simplification made without departing from the spiritual essence and principle of the present disclosure should be equivalent replacements, and all are included in the protection scope of the present disclosure.

The invention claimed is:

1. A method for separating and recovering valuable metals from waste ternary lithium batteries, comprising the following steps:

(1) adding a persulfate and a first acid to a waste ternary lithium battery powder for oxidative acid leaching, and conducting solid-liquid separation to obtain a leaching liquor and a leaching residue; the oxidative acid leaching is conducted at a temperature of 80° C. to 120° C. and a pH of 0.5 to 1.0; in the oxidative acid leaching, a molar ratio of a total amount of nickel, cobalt, and manganese in the waste ternary lithium battery powder to an amount of the persulfate is 1:(0.1-3.5); and the waste ternary lithium battery powder and the persulfate is first mixed to obtain a mixture, and then the mixture is subjected to oxidative acid leaching, wherein a solid-to-liquid ratio of the mixture to the first acid in the oxidative acid leaching is 200 to 600 g/L;

(2) adding an alkali to the leaching liquor to allow a first precipitation reaction, and conducting solid-liquid separation to obtain a first liquid phase; adding a sulfide salt to allow a second precipitation reaction, and conducting solid-liquid separation to obtain a second liquid phase; and adjusting a pH of the second liquid phase to allow a third precipitation reaction, and conducting solid-liquid separation to obtain a nickel hydroxide precipitate and a liquid phase A; the pH is adjusted to 9.5 to 10.0; and the first precipitation reaction is conducted at a pH of 5.0 to 5.5;

(3) adding a carbonate to the liquid phase A to allow a precipitation reaction, and conducting solid-liquid separation and collecting a solid phase to obtain lithium carbonate; and (4) subjecting the leaching residue obtained in step (1) to calcination, then adding a second acid and a chlorate, heating a resulting mixture, and conducting solid-liquid separation to obtain a solid phase and a liquid phase, wherein the solid phase is manganese dioxide and the liquid phase is a cobalt solution; the leaching residue is composed of a manganese dioxide, a cobalt dioxide. and a graphite, through the calcination the graphite reacts with oxygen to generate carbon dioxide, the manganese dioxide and the cobalt dioxide are decomposed into $Mn_2O_3$ and CoO; a molar ratio of manganese in the leaching residue to the chlorate is 1:(0.2-0.5), and the heating is conducted at 80° C. to 100° C. for 1 h to 5 h.

2. The method for separating and recovering valuable metals from waste ternary lithium batteries according to claim 1, wherein in step (1), the persulfate is at least one selected from the group consisting of sodium persulfate, potassium persulfate, and ammonium persulfate.

3. The method for separating and recovering valuable metals from waste ternary lithium batteries according to claim 1, wherein in step (2), the alkali is one or two selected from the group consisting of sodium hydroxide and potassium hydroxide.

4. The method for separating and recovering valuable metals from waste ternary lithium batteries according to claim 1, wherein in step (2), the sulfide salt is one or two selected from the group consisting of sodium sulfide and potassium sulfide.

5. The method for separating and recovering valuable metals from waste ternary lithium batteries according to claim 1, wherein in step (3), the carbonate is one or two selected from the group consisting of sodium carbonate and potassium carbonate.

6. The method for separating and recovering valuable metals from waste ternary lithium batteries according to claim 1, wherein in step (1), the first acid is one selected from the group consisting of sulfuric acid and hydrochloric acid; and in step (4), the second acid is one selected from the group consisting of sulfuric acid and hydrochloric acid.

7. The method for separating and recovering valuable metals from waste ternary lithium batteries according to claim 1, wherein in step (4), the chlorate is one or two selected from the group consisting of sodium chlorate and potassium chlorate.

8. The method for separating and recovering valuable metals from waste ternary lithium batteries according to claim 1, wherein in step (4), the liquid phase is used to prepare cobalt hydroxide.

* * * * *